(12) United States Patent
Chung

(10) Patent No.: US 10,729,175 B2
(45) Date of Patent: Aug. 4, 2020

(54) VAPORIZER ELECTRICAL SYSTEM HAVING A MOVING ELECTRODE WITH A COMBINED ELECTRICAL AND AIRFLOW REGULATION FUNCTION

(71) Applicant: Esquire Properties Trading Inc., Walnut, CA (US)

(72) Inventor: Henry Chung, Walnut, CA (US)

(*) Notice: Subject to any disclaimer, the term of this patent is extended or adjusted under 35 U.S.C. 154(b) by 207 days.

(21) Appl. No.: 15/910,313

(22) Filed: Mar. 2, 2018

(65) Prior Publication Data
US 2019/0269173 A1   Sep. 5, 2019

(51) Int. Cl.
| A24F 13/00 | (2006.01) |
| A24F 17/00 | (2006.01) |
| A24F 25/00 | (2006.01) |
| A24F 47/00 | (2020.01) |
| H01M 4/76  | (2006.01) |
| A24F 7/00  | (2006.01) |

(52) U.S. Cl.
CPC ............ *A24F 47/002* (2013.01); *A24F 7/00* (2013.01); *H01M 4/765* (2013.01); *H01M 2220/30* (2013.01)

(58) Field of Classification Search
CPC ........ A24F 47/008; A24F 47/002; A24F 7/00; H01M 2220/30; H01M 4/765
USPC ................................................. 131/328, 329
See application file for complete search history.

(56) References Cited

U.S. PATENT DOCUMENTS

| 10,021,917 B2* | 7/2018 | Dai ........................... H05B 3/44 |
| 2015/0027464 A1* | 1/2015 | Liu ........................ A24F 47/008 131/329 |
| 2015/0196062 A1* | 7/2015 | Li ........................... A24F 47/008 131/329 |
| 2015/0237918 A1* | 8/2015 | Liu ........................ A24F 47/008 131/328 |
| 2015/0327597 A1* | 11/2015 | Li ........................... A24F 47/008 131/329 |
| 2016/0000145 A1* | 1/2016 | Liu ........................ A61M 15/06 131/329 |
| 2019/0142063 A1* | 5/2019 | Liu ......................... A24F 47/00 131/329 |
| 2019/0166907 A1* | 6/2019 | Chung ..................... H05B 3/44 |

* cited by examiner

*Primary Examiner* — Hae Moon Hyeon
(74) *Attorney, Agent, or Firm* — Clement Cheng

(57) ABSTRACT

A vaporizer electrical system has a mouthpiece. The mouthpiece is configured to allow a user to aspirate a flow of air through the mouthpiece. A center airflow post is connected to the mouthpiece. The center airflow post has a post opening to admit air through the center airflow post. A burning chamber frame is connected to the center airflow post. The burning chamber frame has a burning chamber frame slot for receiving material. The material is a liquid or solid. A main base connects to the burning chamber frame, and a static electrode connects to the main base. The main base, the burning chamber frame, and the static electrode have a first electrical polarity. A moving electrode is mounted to a gasket insulator.

13 Claims, 3 Drawing Sheets

US 10,729,175 B2

VAPORIZER ELECTRICAL SYSTEM HAVING A MOVING ELECTRODE WITH A COMBINED ELECTRICAL AND AIRFLOW REGULATION FUNCTION

FIELD OF THE INVENTION

The present invention is in the field of vaporizers.

DISCUSSION OF RELATED ART

A variety of different vaporizers provide a means for vaporizing a solid liquid or gel for aspiration by a user. These vaporizers have a tank that holds material for vaporization. The vaporizer also has a heater or vaporization section that is battery-powered and so is connected to a battery.

SUMMARY OF THE INVENTION

A vaporizer electrical system has a mouthpiece. The mouthpiece is configured to allow a user to aspirate a flow of air through the mouthpiece. A center airflow post is connected to the mouthpiece. The center airflow post has a post opening to admit air through the center airflow post.

A burning chamber frame is connected to the center airflow post. The burning chamber frame has a burning chamber frame slot for receiving material. The material is a liquid or solid. The main base connects to the burning chamber frame, and a static electrode connects to the main base. The main base, the burning chamber frame, and the static electrode have a first electrical polarity. A moving electrode is mounted to a gasket insulator. The moving electrode has a spring with a helical spring end that biases the moving electrode downwardly. The moving electrode is glidingly mounted to allow translational movement relative to the main base. The gasket insulator is mounted to the negative base. The moving electrode has a second electrical polarity. The first electrical polarity and the second electrical polarity combine to deliver resistance heating to the burning chamber.

The moving electrode has an electrode upper plate extending in a normal direction perpendicular from an electrode shaft. The moving electrode acts as an air valve that is open when it is in an upper position and closed when it is in a lower position.

The electrode shaft is formed as a tube. The electrode studs extend upwardly from the electrode upper plate at regular intervals and are mounted around a stud cut out. A stud cut out that has a cylindrical shape. The there are a total of at least four electrode studs and a total of at least four electrode gaps formed between the electrode studs. The moving electrode has an electrode air intake formed as an opening on the electrode shaft.

The moving electrode contacts the spring and has airflow through the spring. The moving electrode fits to a moving electrode base that allows a sliding movement between the moving electrode and the gasket insulator groove. The moving electrode is a positive electrode, and wherein the static electrode is a negative base.

The following call out list of elements can be a useful guide in referencing the element numbers of the drawings.
20 Upper Section
21 Mouthpiece
22 Glass Cover Upper Silicone Ring
23 Center Airflow Post
24 Center Post Silicone Rings
25 Upper Groove
26 Lower Groove
27 Post Upper Connector
28 Post Connector
29 Mouthpiece Outlet
30 Combustion Section
31 Burning Sleeve
32 Glass Cover
33 Material Intake
34 Burning Chamber Frame
35 Resistance Heater
36 Burning Chamber Frame Insulator
37 Frame Electrode
38 Main Base
39 Helical Spring End
41 Upper Silicone Gasket
42 Lower Silicone Gasket
43 Spring
44 Positive Electrode
45 Positive Electrode Base
46 Gasket Insulator
47 Negative Base
48 Gasket Insulator Groove
49 Gasket Insulator Bevel
51 Upper Silicone Ring
52 Lower Silicone Ring
53 Mouthpiece Bevel
54 Upper Post Thread
55 Burning Chamber Frame Slot
56 Burning Tube Insulator Slot
57 Frame Electrode Protrusion
61 Electrode Air Intake
62 Negative Base Air Intake
63 Negative Base Lower Thread
65 Electrode Stud
64 Electrode Gap
65 Electrode Stud
66 Electrode Bottom Tip
67 Electrode
68 Stud Cut Out
69 Stud Bevel
81 Electrode Upper Plate
82 Positive Electrode Base Opening
83 Silicone Gasket Insulator Opening
84 Main Base Opening
85 Burning Chamber Frame Insulator Opening
86 Post Opening
87 Mouthpiece Opening
88 Burning Chamber Sleeve Opening
89 Negative Base Opening
91 Ring Seal
92 Negative Base Hollow

DETAILED DESCRIPTION OF THE PREFERRED EMBODIMENT

Figure 1:
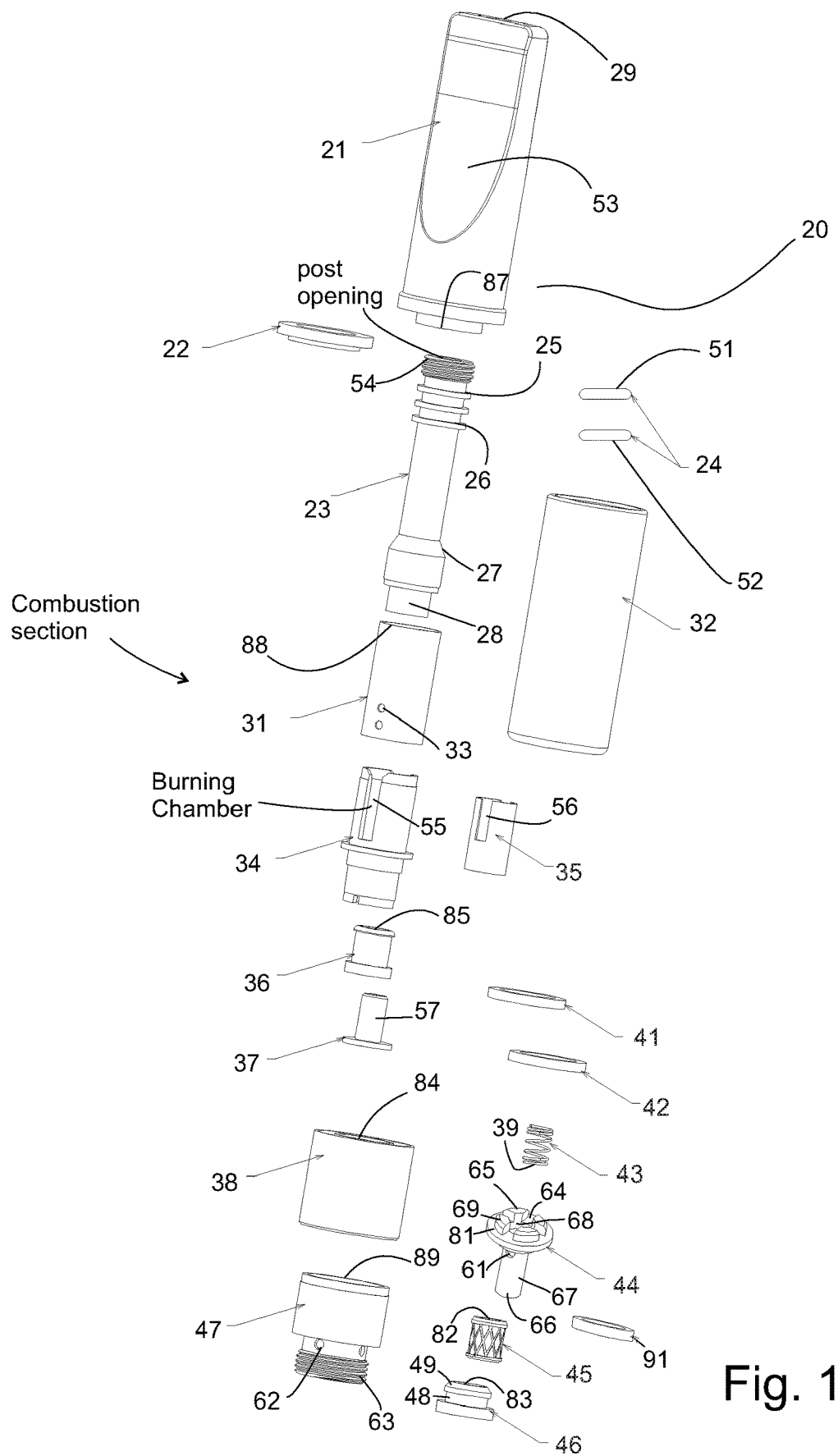
FIG. 1 is an exploded view of the present invention.
Figure 2:
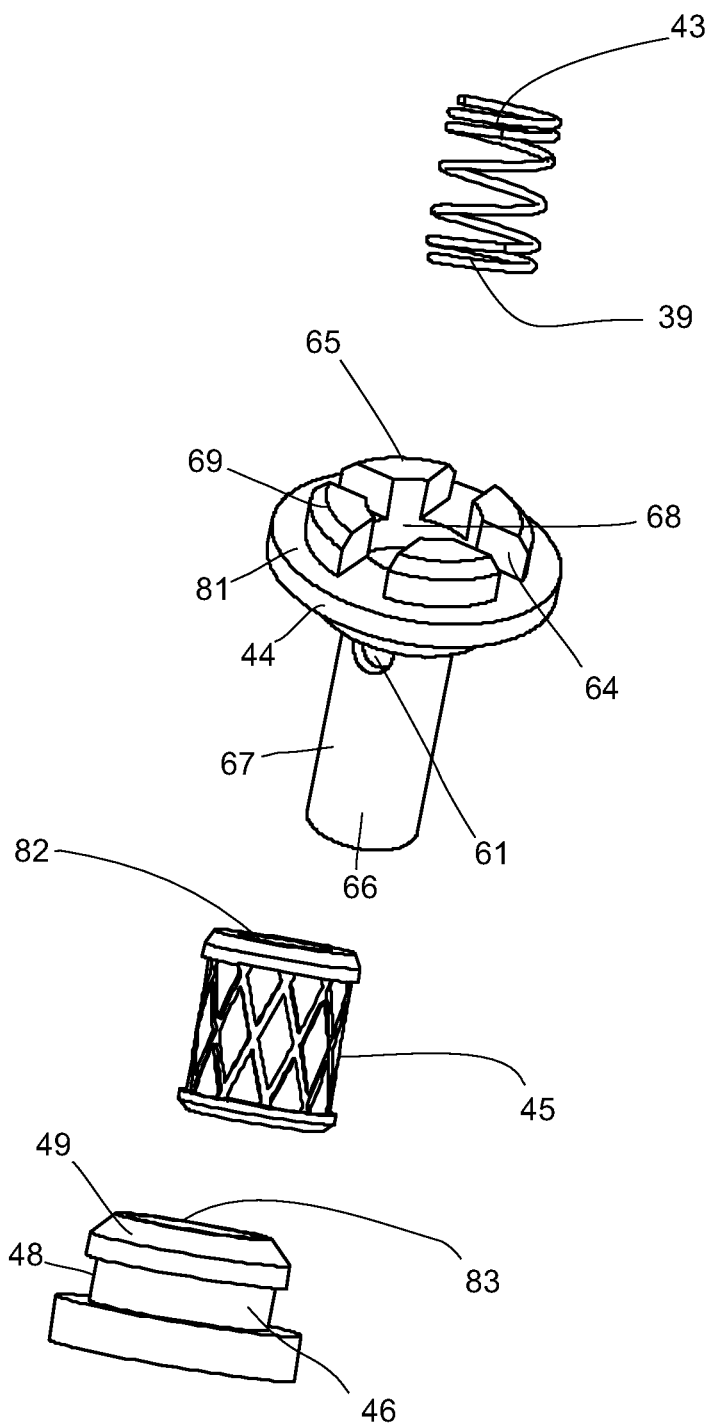
FIG. 2 is a close-up exploded view of the present invention.
Figure 3:
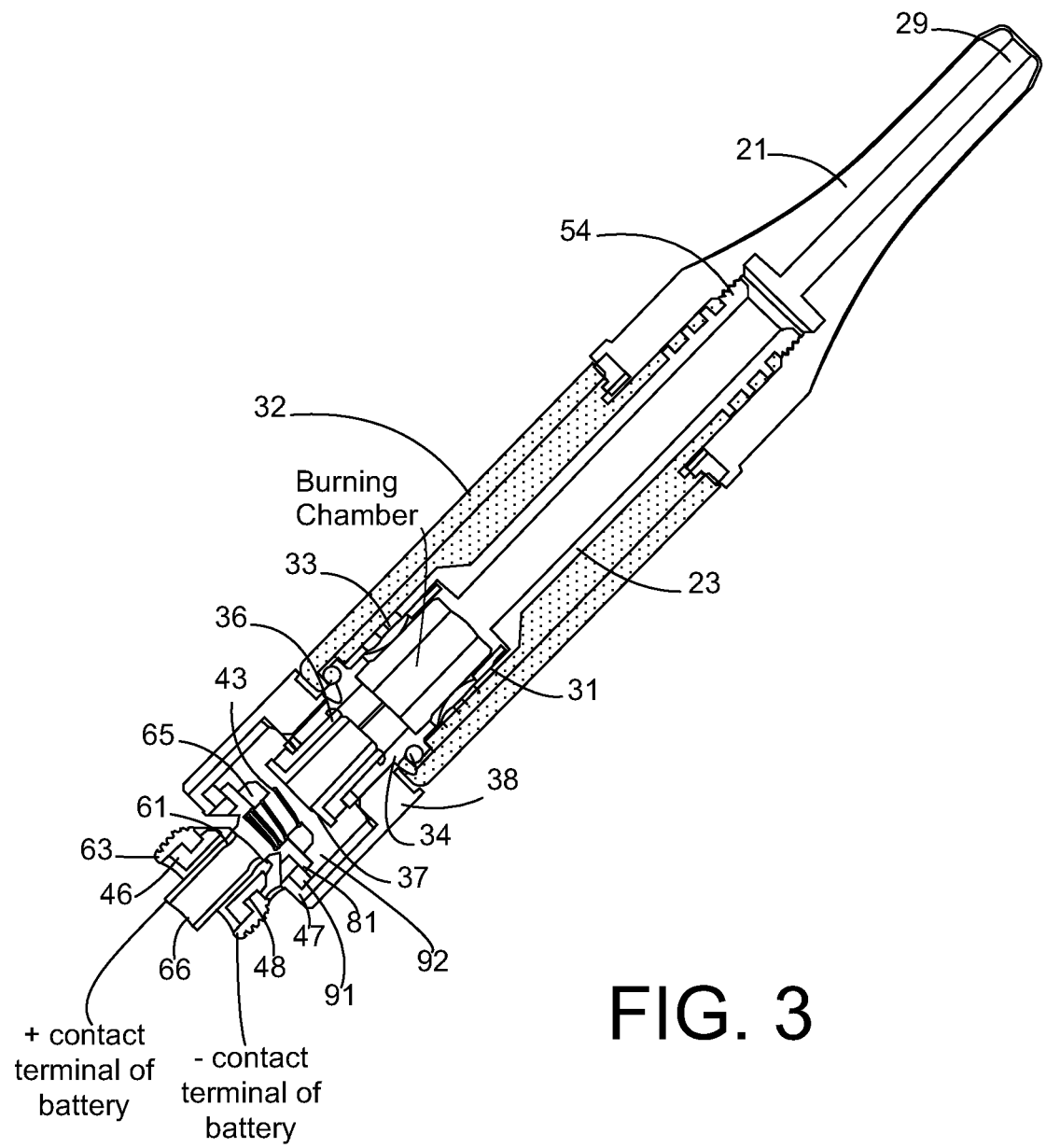
FIG. 3 is a cross-section of the present invention.

The present invention is a vaporizer device as seen in FIGS. 1-3. The vaporizer device has an upper section 20 which includes a mouthpiece 21 that a user inhales vapor through. The user places the mouth on the mouthpiece 21.

The lips can rest on mouthpiece bevels 53 on an front and rear side of the mouthpiece 21. The mouthpiece has a mouthpiece outlet 29 at the upper tip of the mouthpiece. At a lower tip of the mouthpiece, the mouthpiece opening 87 communicates with the mouthpiece outlet 29. The mouthpiece opening 87 receives a glass cover upper silicone ring 22.

The upper section 20 also includes a center airflow post 23. The mouthpiece 21 can be externally threaded for connection to the center airflow post 23. The upper post thread 54 of the center airflow post 23 can engage internal thread in the mouthpiece 21. The upper post thread 54 can engage a pair of silicone rings 24 to the mouthpiece 21. An upper silicone ring 51 and a lower silicone ring 52 can fit into indentations formed on the center airflow post 23. The upper silicone ring 51 can fit into the upper groove 25 and the lower silicone ring 52 can fit into the lower groove 26. The center airflow post 23 also includes a post upper connector 27 and a post lower connector 28. The post lower connector 28 connects to a burning chamber frame 34. The post upper connector 27 is formed as a bevel of a conical section that increases diameter from a smaller diameter of the center airflow post 23 to a larger diameter.

A glass cover 32 engages a lower surface of the glass cover upper silicone ring 22 to provide a waterproof seal. The upper surface of the upper silicone ring engages a lower surface of the mouthpiece 21. The center airflow post 23 extends through the glass cover 32 and is preferably coaxial to the glass cover 32. The post lower connector 28 fits to an upper portion of the burning chamber frame 34. The burning chamber frame 34 receives a burning chamber sleeve 31 which fits over the burning chamber frame 34. Combustion material such as gel, water or a solid substance such as tobacco can be held between the glass cover 32 and the center airflow post 23. The burning chamber sleeve 31 has a plurality of material intakes 33 formed as openings and are disposed on a lower portion of the burning chamber sleeve 31. The openings can be dispersed around the burning chamber sleeve 31 such that adjustment of the burning chamber sleeve 31 can control the amount of airflow through the material intake 33. The material intake 33 is aligned to a burning chamber frame slot 55 when the burning chamber receives outside material through the material intake 33. A wick for example can bring material through the material intake 33. The burning chamber frame 34 also includes a resistance heater 35 which is a replaceable module or element that fits inside the burning chamber frame 34. The burning chamber sleeve 31 also has a burning chamber sleeve opening 88 which allows air to pass through the burning chamber sleeve. The burning chamber sleeve opening 88 can be sized with an internal surface that fits over the burning chamber frame 34.

The burning chamber frame slot 55 is cut through the barrel shape of the burning chamber frame 34 such that the burning chamber frame slot 55 defines a pair of prongs, namely a right prong and a left prong. The material and possibly some airflow passes through the burning chamber frame slot 55. A lower end of the burning chamber frame before has an opening that receives a burning chamber frame insulator 36, which can be made of silicone. The burning chamber frame 24 insulator 36 preferably has a burning chamber frame insulator opening 85 formed as a cylindrical opening so that the burning chamber frame insulator 36 is tube shaped. The burning chamber frame insulator opening 85 can be sized to receive a frame electrode protrusion 57 formed on a frame electrode 37. The frame electrode protrusion 57 can protrude upwardly through the burning chamber frame insulator opening 85. The frame electrode 37 has an opposite electrical polarity from the burning chamber frame 34. The burning chamber has an electrical resistance heater for heating a gel, liquid or other combustible solid. The resistance heater assists in generating vapor or smoke into an airflow stream which then passes through the center airflow post 23, then through the mouthpiece 21.

The main base 38 can be formed with a main base opening 84 and in a cylindrical shape. The main base 38 can have an upper surface and a lower surface. The upper surface of the main base preferably includes an upper ring groove for receiving an upper gasket 41. Similarly, the lower surface of the main base 38 can have a lower ring groove to receive a lower gasket 42. The main base can receive a lower portion of the burning chamber frame 34. The main base 38 connects to a negative base 47. The negative base 47 has a negative base opening 89. The negative base also has a negative base air intake 62, which is preferably formed as a plurality of circular openings disposed around a certain periphery of the lower portion of the negative base 47. The negative base also includes a negative base lower thread 63 which is used for connecting to a battery module not shown on FIG. 1. The battery module has a pair of terminals including a positive terminal and a negative terminal. The positive terminal contacts the positive electrode 44 and the negative terminal contacts the negative base 47 at the negative base lower thread 63. Therefore, the main base 38, and the negative base 47 are both electrically conductive.

The frame electrode 37 abuts against a spring 43. The spring 43 can be a helical spring that presses against the frame electrode 37. The spring 43 can also press against the positive electrode 44. The positive electrode 44 generally includes a plurality of electrode studs 65 that protrude upwardly from the positive electrode 44. The electrode studs 65 have electrode gaps 64 between them. The positive electrode 44 may also include an electrode air intake 61. The electrode air intake 61 is preferably in fluid communication with the negative base air intake 62. A positive electrode base 45 can slip over as a sheath to a lower end of the positive electrode 44. The positive electrode 44 can fit into a silicone gasket insulator 46. The silicone gasket insulator 46 insulates the positive electrode 44 electrically from the negative base 47. The positive electrode 44 is mounted to slide up and down within the negative base 47. The positive electrode 44 is preferably coaxial to the negative base 47.

The spring 43 is generally a small spring that has a helical spring end 39 at a lower end. The helical spring end 39 can fit into the stud cut out 68. The stud cut out 68 can be formed as a cylindrical cutout of material that is removed from the electrode stud 65. Each electrode stud 65 preferably includes a stud bevel 69. Air passes through the electrode air intake 61 through the stud cut out 68. Additionally, the electrode studs 65 extend upwardly from the electrode upper plate 81. The electrode gaps 64 can be formed as slots that extend across the electrode upper plate 81. A pair of slots can define a cross-shaped electrode gap before configuration. The positive electrode 44 also has an electrode tube 67 the seven extending downwardly from the electrode upper plate 81. The electrode bottom tip 66 is formed on the electrode tube 67 and contacts the positive terminal of the battery.

The positive electrode base 45 can be formed as a sheath for fitting over the electrode tube 67. The positive electrode base 45 also has a positive electrode base opening 82 that receives the electrode tube 67. The gasket insulator 46 has a silicone gasket insulator opening 83. The gasket insulator 46 is preferably made of silicone and is formed with a gasket insulator groove 48 and a gasket insulator bevel 49 two allow the gasket insulator 46 to fit into a bottom portion of the negative base 47. The gasket insulator 46 also has a silicone gasket insulator opening 83 to allow the electrode bottom tip 66 to protrude downwardly through the gasket insulator 46 and extend downwardly away from a lower surface of the gasket insulator 46.

A user aspirates a flow of air through the mouthpiece and the air can have vapor or smoke entrained within it. It would be obvious to switch the positive and negative polarity in this implementation. Therefore, more generically the negative base is a static electrode and the positive electrode is a moving electrode.

The moving electrode acts as a plunger valve that closes the airflow when in a closed position. The moving electrode therefore has an open position and a closed position. When the user removes the battery from the negative base lower thread, the moving electrode is pushed downwardly from the spring bias by the spring 43. The moving electrode, also called the positive electrode then closes the airflow by the electrode upper plate 81 sealing in a downward motion. The electrode upper plate 81 can act as a stopper to stop the airflow. Alternatively, the electrode air intake 61 can be placed so that it is an opening that is covered when the electrode tube 67 moves down. The air intake 61 could be covered by the positive electrode base 45 or the silicone gasket insulator 46, for example.

Therefore, the key part of the present invention is that the moving electrode has a combined electrical and airflow regulation function. Therefore, if a user does not screw on the negative base lower thread 63 tightly to the battery for example, the moving electrode will not be moved to an upward position which allows cover intake. The user will notice that the air intake is restricted and will tighten the battery to the negative base lower thread 63.

The upper surface of a ring seal 91 lodged in a corner of a negative base hollow 92 of the negative base 47 seals against a lower surface of the electrode upper plate 81. The ring seal 91 is preferably a silicone seal that is not conductive. The seal interface is a ring-shaped interface that creates an airflow restriction or a complete seal.

The present invention can be used for any fluid tank, not necessarily a water chamber, however pure water can be vaporized as well. The center electrode is preferably the positive electrode that can accommodate different batteries interchangeably in a modular fashion. The center electrode creates a pressurized zone that is sealed for helping safe transport of contents inside the tank. The center electrode acts as a mechanical valve for regulating fluid flow and gas flow as well as an electrical contact. The center electrode is adjustable to decrease the oxidation rate of the fluid in the tank. The center electrode can also be screwed or thread mounted as a way of controlling the air intake. The center electrode can be adjusted if it is thread mounted.

The invention claimed is:

1. A vaporizer electrical system comprising:
   a. a mouthpiece, wherein the mouthpiece is configured to allow a user to aspirate a flow of air through the mouthpiece;
   b. a center airflow post connected to the mouthpiece, wherein the center airflow post admits air;
   c. a burning chamber having a burning chamber frame connected to the center airflow post, wherein the burning chamber frame has a burning chamber frame slot for receiving material, wherein the material is a liquid or solid;
   d. a main base connecting to the burning chamber frame, and a static electrode connecting to the main base, wherein the main base, the burning chamber frame, and the static electrode have a first electrical polarity; and
   a moving electrode mounted to a gasket insulator, wherein the moving electrode has a spring with a helical spring end that biases the moving electrode downwardly, wherein the moving electrode is glidingly mounted to allow translational movement relative to the main base, wherein the gasket insulator is mounted to a negative base, wherein the moving electrode has a second electrical polarity, wherein the first electrical polarity and the second electrical polarity combine to deliver resistance heating to the burning chamber at a resistance heater.

2. The vaporizer electrical system of claim 1, wherein the moving electrode has an electrode upper plate extending in a normal direction perpendicular from an electrode shaft.

3. The vaporizer electrical system of claim 2, wherein the electrode shaft is formed as a tube.

4. The vaporizer electrical system of claim 2, wherein electrode studs extend upwardly from the electrode upper plate at regular intervals and are mounted around a stud cut out.

5. The vaporizer electrical system of claim 2, further including a stud cut out that has a cylindrical shape, wherein the stud cut out is formed as a cylindrical cutout of material removed from the electrode stud.

6. The vaporizer electrical system of claim 2, wherein at least four electrode studs and a total of at least four electrode gaps formed between the electrode studs.

7. The vaporizer electrical system of claim 2, wherein the moving electrode has an electrode air intake formed as an opening on the electrode shaft.

8. The vaporizer electrical system of claim 2, wherein the moving electrode contacts the spring and has airflow through the spring between the coils of the helical spring.

9. The vaporizer electrical system of claim 1, wherein the moving electrode is a positive electrode, and wherein the static electrode is a negative base.

10. The vaporizer electrical system of claim 9, wherein the moving electrode has an electrode upper plate extending in a normal direction perpendicular from an electrode shaft.

11. The vaporizer electrical system of claim 10, wherein the electrode shaft is formed as a tube.

12. The vaporizer electrical system of claim 10, wherein the electrode studs extend upwardly from the electrode upper plate at regular intervals and are mounted around a stud cut out, wherein the stud cut out is formed as a cylindrical cutout of material removed from the electrode stud.

13. The vaporizer electrical system of claim 10, wherein the moving electrode has an electrode air intake formed as an opening on the electrode shaft.

* * * * *